Patented Feb. 18, 1947

2,415,938

UNITED STATES PATENT OFFICE 2,415,938

DYESTUFFS OF THE ANTHRAQUINONE SERIES

Joseph Deinet, Glassboro, N. J., assignor to E. I. du Pont de Nemours & Company, Wilmington, Del., a corporation of Delaware No Drawing. Application June 6, 1944, Serial No. 539,029

4 Claims. (Cl. 260—307.5)

This invention relates to preparation of dyestuffs of the anthraquinone series, and more particularly to the preparation of anthraquinone oxazole vat dyes which dye cotton from the usual alkaline hydrosulfite vat in very desirable reddish-orange shades.

While there are a number of dyes in the anthraquinone vat dye class which dye in varying shades of orange, these dyes, particularly in the reddish-orange shades, do not have the fastness to light which is required for many purposes.

It is therefore an object of this invention to provide new vat dyes of the anthraquinone series which dye cotton in reddish-orange shades, which exhibit better light fastness than the known orange dyes or any combination of dyes from which similar shades can be obtained, and which also exhibit as good fastness to bleach, such as peroxide and chlorine, as the existing dyes in the orange and red shades.

I have found that very desirable reddish-orange dyes can be produced by condensing a halogen-bis-anthraquinone oxazole compound with aminoanthraquinones, and that these dyes exhibit better light fastness than the existing orange dyes in the vat dye field, or any combination that can be produced from existing colors which dye in reddish-orange shades, and which also exhibit good fastness to bleach. These colors have the following general formula:

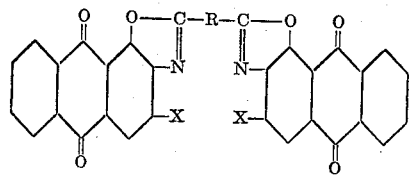

in which R stands for an aryl radical of the benzene or naphthalene series, to which the anthraquinone oxazole groups are attached in either meta- or para-position and in which at least one X stands for an anthraquinonylamino radical and the second X may stand for hydrogen or halogen of the class consisting of chlorine and bromine, and in which either the aryl radical R or the anthraquinonylamino radical or radicals may contain simple monovalent substituents.

The halogen - bis - anthraquinone oxazoles, which are employed as intermediates in the preparation of the dyes of this invention, may be prepared by condensing 1,3-dihalogen-2-amino-anthraquinones with dicarboxylic acids of the benzene or naphthalene series in which the carboxylic acid groups are attached in meta- or para-position with reference to each other. These dye intermediates, wherein R is of the naphthalene series, are more particularly described in copending application Serial No. 539,028, filed of even date herewith.

The following examples, in which the parts used are by weight, are given to illustrate the preparation of the new dyes of this invention.

Example 1

300 parts of nitrobenzene, 39.4 parts of terephthalic acid and 88 parts of thionyl chloride are heated together to 152°–155° C. (reflux) and maintained until the terephthalic acid chloride is completely formed. The mass is then cooled to 120° C. and a gentle stream of dry air is led through the mass to take out excess thionyl chloride. The mass is then cooled to 25° C., 300 parts of nitrobenzene and 150 parts of 1,3-dibromo-2-aminoanthraquinone are added, the mass is heated slowly to 150° C., and maintained for one hour. Then it is heated to 195°–200° C. and maintained for one hour, cooled to 25° C. and filtered. The filter cake is washed with alcohol and dried. The product obtained forms a colorless product which, when vatted with sodium hydrosulfite, gives an orange-brown solution. 1000 parts of nitrobenzene, 84 parts of the above condensation product, 21 parts of sodium carbonate, 42 parts of potassium acetate and 0.1 part of copper powder are agitated and heated to 210°–212° C. and maintained for 5 to 6 hours. The reaction mixture is cooled to 25° C. and filtered. The cake is washed with nitrobenzene, alcohol and hot water (in turn) and dried. The product obtained forms a pale yellow powder. It is vattable with sodium hydrosulfite, yielding a blue violet solution from which cotton is dyed in weak yellow shades, and is believed to have the following formula:

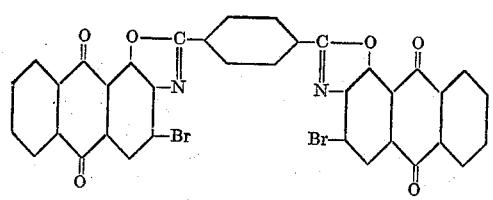

350 parts of nitrobenzene, 25 parts of the dibromoanthraquinone oxazole described above, 15.25 parts of 1-aminoanthraquinone, 12.5 parts of sodium carbonate, and one part of copper acetate are heated together, while agitating, to 210°–211° C. and maintained for six hours. The mass is cooled to 30° C., filtered, and the cake washed with nitrobenzene, alcohol and hot water (in turn) and dried. The product is a dark red-brown powder, vattable with sodium hydrosulfite to yield an orange-brown solution from which cotton is dyed in red-orange shades of excellent fastness properties. It has the following probable formula:

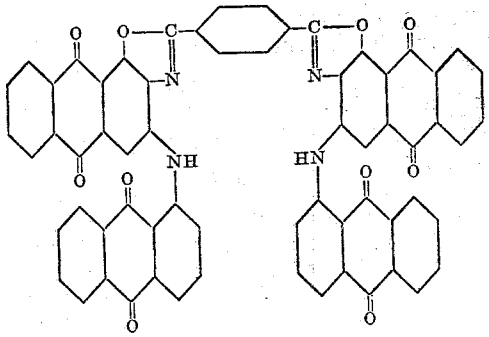

Example 2

750 parts of nitrobenzene, 50 parts of the dibromoanthraquinone oxazole of Example 1, 15.3 parts of 1-aminoanthraquinone, 25 parts of sodium carbonate and 1.5 parts of copper acetate are heated together while agitating to 208°–210° C. and maintained for 8 hours, cooled to 50° C., filtered, washed with nitrobenzene, alcohol, and hot water (in turn) and dried. The product obtained dyes cotton from a hydrosulfite vat in bright orange-red shades of good fastness properties.

Example 3

300 parts of nitrobenzene, 39.4 parts if isophthalic acid and 88 parts of thionyl chloride are heated together to 150°–155° C. (reflux) and maintained until the isophthalyl chloride is formed. After air blowing (to take out excess thionyl chloride), the mass is cooled to 25° C. 300 parts of nitrobenzene and 150 parts of 1,3-dibromo-2-aminoanthraquinone are added, the mass is heated slowly to 195°–200° C., and maintained for 1½ hours. After cooling to 25° C., the solids filtered off, washed with alcohol and dried. 500 parts of nitrobenzene, 40 parts of the above condensation product, 20 parts of potassium acetate, 10 parts of sodium carbonate and 0.2 part of cuprous chloride are heated together with agitation to 211° C. and maintained for several hours. After cooling to 25° C., the solid is filtered off, washed with nitrobenzene, alcohol and hot water (in turn) and dried. The product forms a pale yellow powder and analyzes 22.38% Br (calculated 21.99%), and melts above 400° C. It has the following possible formula:

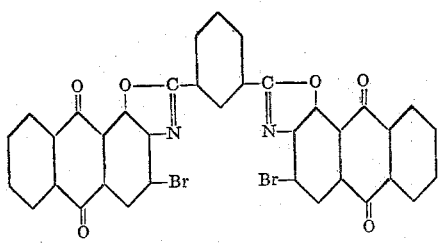

500 parts of nitrobenzene, 32.6 parts of the above desscribed dibromoanthraquinone oxazole, 20 parts of 1-aminoanthraquinone, 16 parts of sodium carbonate, and one part of copper acetate are heated together, while agitating, and maintained at 210° C. for 12 hours. The mass is cooled to 75° C., filtered, washed with nitrobenzene, alcohol and hot water and dried. The resulting di-anthraquinonylamino-compound dyes cotton from a sodium hydrosulfite vat in red-orange shades of good fastness properties. It has the following probable formula:

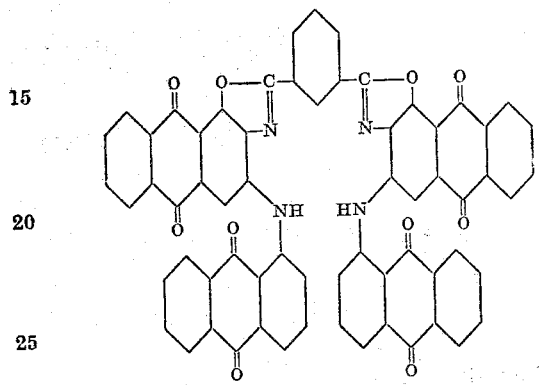

Example 4

150 parts of nitrobenzene, 24 parts of monochloro-terephthalic acid and 43 parts of thionyl chloride are heated together to 125° C. and maintained until the acid chloride is formed. The solution is cooled to 110° C. and air blown for 1.5 hours, then further cooled to 25° C. 240 parts of nitrobenzene and 80 parts of 1,3-dibromo-2-aminoanthraquinone are added and the mass heated slowly to 205° C. and maintained for 1.5 hours. The acylation product is cooled to 30° C., filtered, washed with nitrobenzene, then with alcohol and dried.

400 parts of ortho-dichloro-benzene, 40 parts of the above condensation product, 20 parts of potassium acetate, 10 parts of sodium carbonate and 0.1 part of copper powder are heated together, while agitating, to 180° C. and maintained for 10 hours. The resulting oxazole compound is isolated as in previous examples. The product is a pale yellow powder, vattable with sodium hydrosulfite to a violet solution. It has the following probable formula:

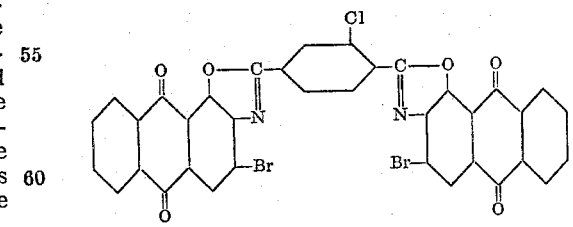

and contains both bromine and chlorine.

250 parts of nitrobenzene, 15 parts of the above described dibromo-monochloro-bis-anthraquinone oxazole, 13.2 parts of 1-aminoanthraquinone, 7.5 parts of sodium carbonate and 0.5 part of copper acetate are heated together, while agitating, to 210° C. After 12 hours at 210° C., the charge is cooled to 90° C., filtered, washed with nitrobenzene, alcohol and hot water (in turn) and dried. The product obtained dyes cotton from a sodium hydrosulfite vat in red-orange shades of good fastness properties.

Example 5

210 parts of nitrobenzene, 35.5 parts of terephthalic acid and 76 parts of thionyl chloride are heated together to 152° C. until the acid chloride is formed. The solution is cooled to 120° C., air blown for 1.5 hours, then further cooled to 25° C. 50 parts of 1-chloro-2-aminoanthraquinone and 50 parts of nitrobenzene are added, and the mass is heated slowly to 115° C. and maintained for one hour. After cooling to 60° C., 400 parts of nitrobenzene and 74 parts of 1,3-dibromo-2-aminoanthraquinone are added, the mixture heated to 210° C. and maintained at 210° C. for 1.5 hours, after which it is cooled to 30° C. and filtered. The cake is washed with alcohol and dried.

600 parts of nitrobenzene, 60 parts of the above condensation product, 30 parts of potassium acetate, 15 parts of sodium carbonate and 0.2 part of copper powder are heated together while agitating and maintained for 4 hours at 210° C. The mass is cooled to 50° C., filtered, and the cake is washed with nitrobenzene, alcohol and hot water (in turn) and dried. The product is a pale yellow powder vattable with sodium hydrosulfite to a violet-blue solution. It has the following probable formula:

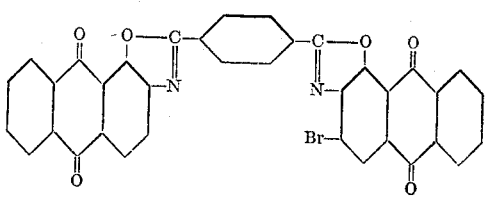

350 parts of nitrobenzene, 30 parts of the monobromo-bis-anthraquinone oxazole described above, 11 parts of 1-aminoanthraquinone, 15 parts of sodium carbonate and one part of copper acetate are heated together, while agitating, and maintained at 210° C. for six hours. The mass is cooled to 50° C., filtered, the cake washed with nitrobenzene, alcohol and hot water (in turn) and dried. The product obtained dyes cotton from a sodium hydrosulfite vat in bright reddish-orange shades of good fastness properties.

Example 6

350 parts of nitrobenzene, 25 parts of the dibromo derivative of the oxazole disclosed in Example 1 of application Serial No. 539,028 and corresponding to the probable formula:

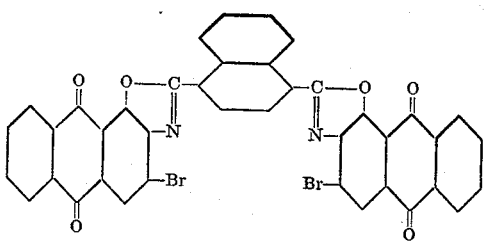

15 parts of 1-aminoanthraquinone, 12.5 parts of sodium carbonate and one part of copper acetate are heated together, while agitating, to 210°–211° C. and maintained for 12 hours. The mass is cooled to 30° C., filtered, and the cake washed with nitrobenzene, alcohol and hot water (in turn) and dried. The product is vattable with sodium hydrosulfite to yield a red-orange-brown solution from which cotton is dyed in reddish-orange shades of very good strength and of excellent fastness properties. It has the following probable formula:

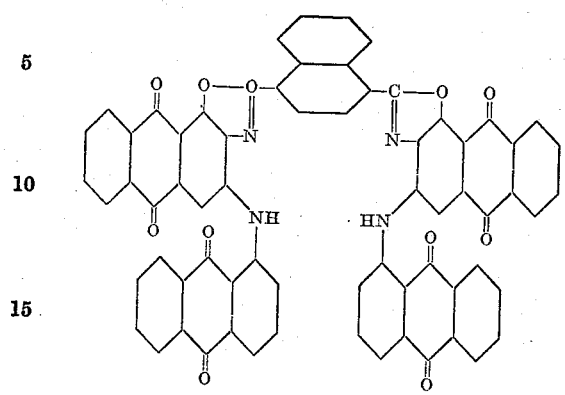

Example 7

500 parts of nitrobenzene, 32 parts of the dibromo derivative of the dibromo-bis-anthraquinone oxazole disclosed in Example 1, 20.5 parts of 1-amino-5-methoxyanthraquinone, 20 parts of sodium carbonate and 1.5 parts of copper acetate, are heated together to 210° C. and maintained for 12 hours. The mass is cooled to 50° C., filtered and the cake washed with nitrobenzene, alcohol and hot water (in turn) and dried.

The product is a dark-brown powder vattable with sodium hydrosulfite to yield an orange-dark-brown solution from which cotton is dyed in reddish-orange shades of good fastness properties.

In place of the unsubstituted 1-aminoanthraquinones employed in the above condensations, 1-aminoanthraquinones carrying simple monovalent substituents in the 5- or 8-position may be employed to give reddish-orange dyes having similar dyeing properties. The simple monovalent substituents may be halogen, the benzoylamino group or the methoxy radical. Where the methoxy or benzoylamino groups are in the 4-position on the anthraquinonylamino radical, the resulting condensation products dye in brown shades, as distinguished from the desirable reddish-orange shades of the compounds of this application. As further illustrated in the above examples, the benzene or naphthalene radical connecting the two anthraquinone oxazole groups may contain halogen. Other simple monovalent substituents which do not alter the shade of the dyestuff may obviously be present in the benzene or naphthalene nucleus, depending upon the particular dicarboxylic acid of the benzene or naphthalene compound employed.

As further illustrated in the above examples, the condensation of only one anthraquinonylamino radical on the halogen-bis-anthraquinone oxazole produces a reddish-orange dye of good fastness properties.

I claim:

1. The reddish-orange vat dyes of the anthraquinone oxazole series which have the following general formula:

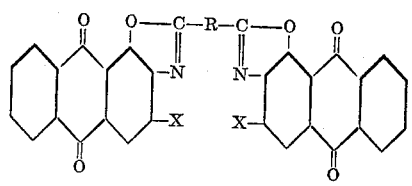

wherein R stands for a radical of the group consisting of the benzene and naphthalene radicals and the monohalogen benzene and naphthalene radicals to which the anthraquinone oxazole groups are attached in one of the positions meta- and para- with respect to each other, and in which at least one X stands for an anthraquinonylamino radical and the remaining X for a radical of the group consisting of an anthraquinonylamino radical, hydrogen and halogen, which anthraquinonylamino radical in each case carries the amino group in the 1-position in the anthraquinone nucleus and is of the group consisting of the anthraquinonylamino radical which carries no further substituents and those containing a substituent in one of the positions 5 and 8 on the anthraquinonyl radical with respect to the amino group of the class consisting of halogen, benzoylamino and methoxy groups.

2. The reddish-orange vat dye of the following formula:

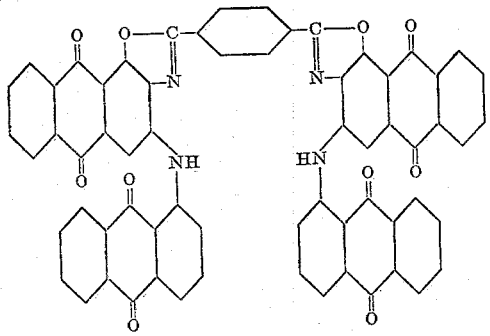

3. The reddish-orange vat dye of the anthraquinone oxazole series having the formula:

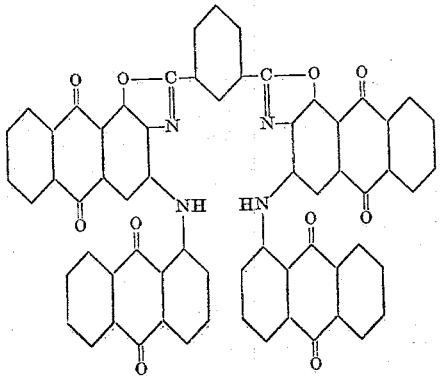

4. The reddish-orange vat dye of the anthraquinone oxazole series having the formula:

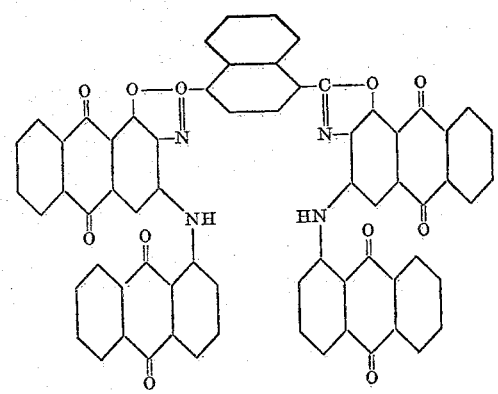

JOSEPH DEINET.

REFERENCES CITED

The following references are of record in the file of this patent:

UNITED STATES PATENTS

| Number | Name | Date |
| --- | --- | --- |
| 2,299,826 | Kern | Oct. 27, 1942 |
| 2,272,011 | Kern | Feb. 3, 1942 |